United States Patent
Santo et al.

(10) Patent No.: US 7,281,254 B2
(45) Date of Patent: Oct. 9, 2007

(54) OPTICAL DISC DRIVE HAVING A TRAVERSE HOLDER THAT IS ROTATABLE AROUND AN AXIS THAT IS MUTUALLY DIFFERENT FROM THE AXIS OF A TRAVERSE BASE

(75) Inventors: Takeo Santo, Hirakata (JP); Kozo Ezawa, Hirakata (JP); Masahiro Inata, Itami (JP); Yoshito Saji, Ashiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 469 days.

(21) Appl. No.: 10/917,618

(22) Filed: Aug. 12, 2004

(65) Prior Publication Data

US 2005/0044558 A1    Feb. 24, 2005

(30) Foreign Application Priority Data

Aug. 19, 2003    (JP)    ............................. 2003-295109

(51) Int. Cl.
  *G11B 17/03*    (2006.01)
  *G11B 17/04*    (2006.01)
(52) U.S. Cl. ...................................... 720/616; 720/613
(58) Field of Classification Search ................ 720/616, 720/652, 692
  See application file for complete search history.

(56) References Cited

U.S. PATENT DOCUMENTS 5,777,978 A * 7/1998 Ota et al. .................... 720/693
6,480,453 B2 * 11/2002 Ahn ........................... 720/639
6,741,536 B1 * 5/2004 Ariyoshi et al. ............. 720/635
6,912,723 B2 * 6/2005 Yumitori et al. ............. 720/692
6,918,130 B2 * 7/2005 Ariyoshi et al. ............. 720/691
2005/0204373 A1 * 9/2005 Ueno et al. .................. 720/616

FOREIGN PATENT DOCUMENTS

| JP | 04-098646 B2 |   | 3/1992 |
| JP | 07244908 A | * | 9/1995 |
| JP | 09251696 A | * | 9/1997 |
| JP | 11066716 A | * | 3/1999 |
| JP | 2003-217214 A |   | 7/2003 |

* cited by examiner

*Primary Examiner*—Angel Castro
*Assistant Examiner*—Christopher R. Magee
(74) *Attorney, Agent, or Firm*—Akin Gump Strauss Hauer & Feld LLP

(57) ABSTRACT

An optical disc drive includes: a tray to mount a cartridge including a disc and having a positioning hole; a chassis for supporting the tray to move in a first direction; a spindle motor; an optical head; a traverse base, which is supported on the chassis so as to rotate around an axis defined in a second direction near one end of the chassis in the first direction and which mounts the spindle motor and the optical head thereon, the second direction being parallel to the disc and perpendicular to the first direction; a traverse holder coupled to the traverse base; a positioning pin provided for the traverse holder and fitting in with the positioning hole, thereby positioning the cartridge; and an elevating portion for moving a portion of the traverse holder in a third direction perpendicularly to the disc.

12 Claims, 11 Drawing Sheets

OPTICAL DISC DRIVE HAVING A TRAVERSE HOLDER THAT IS ROTATABLE AROUND AN AXIS THAT IS MUTUALLY DIFFERENT FROM THE AXIS OF A TRAVERSE BASE

BACKGROUND OF THE INVENTION

1. Field of the Invention

The present invention relates to an optical disc drive for reading and/or writing information from/on a disk storage medium (e.g., an optical disc) stored in a cartridge.

2. Description of the Related Art

Various types of disk storage media such as CDs and DVDs, from/on which information can be read and/or written using a light beam, have become very popular these days. Those disk storage media will be simply referred to herein as "discs". Accordingly, optical disc drives are now used extensively to read and/or write information from/on these discs. Also, in order to store video information on those discs, techniques of increasing the storage densities of discs have been quickly developed day after day.

In order to increase the storage density of a disc, recording marks or pits on the disc or the spot size of a light beam for use in read and write operations need to be reduced. For that purpose, in an optical disc drive, the laser diode, functioning as the light source of the light beam, has a shortened wavelength and the lens to focus the light beam has an increased numerical aperture (NA).

However, as the recording marks, pits and spot size of the read/write light beam are reduced, the dust, finger marks and scratches to be attached to, or done on, the surface of a disc are more and more likely to affect the information being read or written. Thus, a cartridge to protect the disc surface from those harmful matters has become increasingly important lately.

A conventional optical disc drive, which is designed to process an optical disc in a cartridge, may include a spindle motor for rotating and driving the disc, an optical head for reading and/or writing information from/on the disc, and a traverse base holding the spindle motor and optical head thereon, for example. The traverse base includes a positioning member for positioning the cartridge. After the cartridge has been loaded into the disc drive by a loading mechanism, the traverse base is elevated and driven, thereby clamping the disc in the cartridge onto the spindle motor. In such a configuration, however, the positioning member for positioning the cartridge needs to be mounted on the traverse base, thus making the traverse base bigger and also making it difficult to reduce the overall size and weight of the drive or the manufacturing cost thereof. In addition, heavier load is placed on the motor for elevating and driving the traverse base, and therefore, a lot of noise is produced.

Japanese Laid-Open Publication No. 2003-217214 discloses another conventional optical disc drive to process a disc in a cartridge. In this optical disc drive, the traverse base is separated from the positioning member to overcome the problem described above. As shown in FIG. 11, that type of optical disc drive includes a body 100 and is designed so as to accommodate a cartridge 102 in which a disc 101 is stored. Hereinafter, it will be described how this optical disc drive operates after having been loaded with the cartridge 102 and until getting ready to perform a read or write operation on the optical disc 101.

First, the operator puts the cartridge 102, including the disc 101, on a tray 103. The tray 103 is supported on a bottom chassis 106 so as to be movable in a loading/unloading direction A. A loading motor 108 is provided on the bottom chassis 106 and its rotation is transmitted to a rack on the back surface of the tray 103 by way of a loading gear system 109, thereby pulling the tray 103 into the body 100.

The shutter 102a of the cartridge 102 is opened and closed by an opener 105 provided for the tray 103. The opener 105 is provided so as to slide in the direction in which the shutter 102a moves while the cartridge 102 is mounted on the tray 103 and the tab of the opener 105 contacts with a protrusion of the shutter 102a. A pin is provided for the opener 105 so as to interlock with a cam groove of an upper chassis 107. As the tray 103 is pulled in, the pin goes along the cam groove, thereby sliding the opener 105 and the shutter 102a as well.

As soon as the tray 103 has been pulled in, the operation of moving a clamper to clamp the optical disc 101 starts. A clamp arm 125 is supported so as to rotate at the middle with respect to the upper chassis 107. A clamper 124 is provided at one end of the clamper arm 125, while a bent portion is provided at the other end of the clamper arm 125. The clamper 124 is made up of two vertically splitting members and is designed such that the upper and lower members of the clamper 124 sandwich the edge of an opening of the clamper arm 125 with some gap provided between them. Accordingly, the clamper 124 is supported so as to rotate with respect to the clamper arm 125. While the tray 103 is drawn out of the body 100, the bent portion protrudes toward the back surface of the upper chassis 107 and the clamper 124 protrudes upward from the upper surface of the upper chassis 107.

When the tray 103 has been pulled in the body 100, a portion of the tray 103 pushes up the bent portion of the clamper arm 125. As a result, the clamper arm 125 rotates, thereby pressing the clamper 124 down. As a result of the opening operation of the shutter 102a as described above, the clamp area of the disc 101 is exposed and the clamper 124 that has been pressed down is now located right over the clamp area of the disc 101. In this manner, the clamping operation gets ready.

Next, a cartridge positioning operation will be described with reference to FIGS. 11, 12 and 13. FIGS. 12 and 13 illustrate the structures of a positioning pin piece 118 and a slide cam 123 for use to position the cartridge 102.

The positioning pin piece 118 includes a positioning pin 118a to close a positioning hole 102b of the cartridge 102 and a pair of convex portions 118b. These convex portions 118b fit with the cam grooves 123a of the slide cam 123 so as to slide along the grooves 123a. Accordingly, as the slide cam 123 shifts in the direction D, the positioning pin 118a moves upward in the direction C.

The slide cam 123 is secured to the bottom chassis 106 so as to slide perpendicularly to the loading/unloading direction A of the tray 103. The sliding protrusion 123b of the slide cam 123 fits with, and slides along, a grooved load cam (not shown) on the back surface of the tray 103. The slide cam 123 further includes a rack portion 123c that engages with the loading gear system 109.

The load cam provided on the back surface of the tray 103 includes a sloped portion to move the slide cam 123 slightly in the vicinity of an insert position where the tray 103 is pulled in completely and an extended portion for keeping on guiding the sliding protrusion 123b perpendicularly to the direction in which the tray 103 is shifting. Accordingly, just before the tray 103 has been pulled in fully as a result of the rotation of the loading motor 108, the sloped portion of the load cam drives the slide cam 123 a little, thereby starting to engage the rack portion 123c of the slide cam 123 with the loading gear system 109. Even after the rack portion 123c of the slide cam 123 has disengaged itself from the loading gear system 109 to complete the insertion, the slide cam 123 keeps on sliding along the extended portion of the load cam. The slide cam 123 drives the positioning pin piece 118 along the cam grooves 123a, thereby inserting the positioning pin 118a into the positioning hole 103a of the cartridge. In this manner, the cartridge 102 can be fixed at a predetermined position.

An assist arm 135 for assisting the elevation of the positioning pin piece 118 is provided in a rotatable state for the bottom chassis 106 and is driven as the slide cam 123 slides. If the cartridge 102 has shifted significantly within the tray 103, then an insertion force to correct the shift of the cartridge 102 is needed in inserting the positioning pin piece 118 into the positioning hole 102b. Accordingly, the assist arm 135 assists the elevation of a portion surrounding the positioning pin 118a, thereby preventing the positioning pin piece 118 from being distorted or deformed. Also, the assist arm 135 contributes to inserting the positioning pin 118a into the positioning hole 102b in one way or another, thereby correcting the shift of the cartridge 102.

Also, an adjust plate 136 is further provided for the bottom chassis 106 to regulate the instability of the positioning pin piece 118 in the loading/unloading direction A. Thus, the positioning pin 118a can have its position in the loading/unloading direction A regulated and is fixed to the bottom chassis 106.

The traverse base 112 supports a spindle motor 113 to mount and rotate the disc 101 thereon and an optical head 114, which can be shifted by a guide shaft 115 in the radial direction of the disc 101 so as to perform read and write operations on the disc 101. The traverse base 112 is elastically held by a traverse holder 117 with rubber dampers 120 provided at the four corners. Two rotation sub-shafts 117a are provided on two side surfaces of the traverse holder 117 and are arranged on a plane that is defined parallel to the surface of the disc 101. By engaging the rotation sub-shafts 117a with the bearings 106a of the bottom chassis 106, the traverse base 112 can be supported so as to rotate on the rotation sub-shafts 117a.

Cam followers 117b stick out of a side surface of the traverse holder 117 so as to face the slide cam 123 and fit with, and slide along, the cam grooves 123a. As the slide cam 123 slides, the traverse holder 117 and traverse base 112 rotate on the sub-shafts 117a and elevate upward. As a result, the spindle motor 113 is also elevated and the disc 101 is mounted on the turntable 113a. Also, due to an attraction between a magnetic body embedded at the top center of the spindle motor 113 and a magnet included in the clamper 124, the clamper 124 presses the disc 101 toward the turntable 113a. In this manner, the clamping operation is finished.

The positioning pin piece 118 also fits with and slides along the cam grooves 123a of the slide cam 123. Accordingly, as the slide cam 123 slides, first, the positioning pin piece 118 elevates to perform the cartridge positioning operation described above, and then the traverse holder 117 elevates after a while, thereby mounting the disc 101 on the spindle motor 113.

In an optical disc drive having such a structure, the traverse base is provided separately from the positioning member. Thus, the size of the traverse base can be reduced, the load on the motor to elevate and drive the traverse base can be lightened, and the noise produced can be minimized.

However, in the optical disc drive disclosed in Japanese Laid-Open Publication No. 2003-217214, the positioning pin for positioning the cartridge should be a member that is independent of the traverse base. In addition, the assist lever to assist the movement of the positioning pin and the adjust plate for positioning control are also needed, thus increasing the number of members that make up the optical disc drive and increasing the manufacturing cost, too.

Generally speaking, the smaller the number of components intervening between the disc and the cartridge, the smaller the sum of errors between the disc and the cartridge and the higher the positional accuracy should be. Nevertheless, in the optical disc drive disclosed in Japanese Laid-Open Publication No. 2003-217214, there are as many as six components (namely, the spindle motor, traverse base, rubber dampers, traverse holder, bottom chassis and positioning pin) between the disc and the cartridge. For that reason, the position of the positioning pin must be precisely controlled with respect to the disc motor, thus increasing the number of manufacturing process steps and the manufacturing cost. Also, the traverse holder holds the overall traverse base to increase the size and cost of that member and make it difficult to downsize the overall drive.

SUMMARY OF THE INVENTION

In order to overcome the problems described above, preferred embodiments of the present invention provide an optical disc drive that can position a given cartridge accurately enough using a simple mechanism.

An optical disc drive according to a preferred embodiment of the present invention preferably includes a tray, a chassis, a spindle motor, an optical head, a traverse base, a traverse holder, a positioning pin, and an elevating portion. The tray preferably mounts thereon a cartridge in which a disc is housed as an information storage medium and which has a positioning hole. The chassis preferably supports the tray such that the tray is movable in a first direction. The spindle motor preferably mounts and rotates the disc in the cartridge thereon. The optical head preferably reads or writes information from/on the disc. The traverse base is preferably supported on the chassis so as to rotate around an axis that is defined in a second direction near one end of the chassis in the first direction and preferably mounts the spindle motor and the optical head thereon. The second direction is preferably parallel to the disc in the cartridge mounted on the tray and perpendicular to the first direction. The traverse holder is preferably coupled to the traverse base. The positioning pin is preferably provided for the traverse holder and preferably fits in with the positioning holes of the cartridge, thereby positioning the cartridge. The elevating portion preferably moves a portion of the traverse holder in a third direction that is defined perpendicularly to the disc in the cartridge.

In one preferred embodiment of the present invention, the optical disc drive preferably further includes a first pair of damping members for coupling the traverse holder and the traverse base together near the other end of the chassis in the first direction. The first pair of damping members preferably has elasticity and damping property.

In another preferred embodiment, the optical disc drive preferably further includes a second pair of damping members for coupling the chassis and the traverse base together so as to allow the traverse base to rotate around the axis that is defined in the second direction.

In another preferred embodiment, the positioning pin preferably forms an integral part of the traverse holder.

In this particular preferred embodiment, the traverse holder includes a base portion and a pair of arm portions extending from the base portion toward the one end of the traverse base, and the end of each arm portion is preferably secured to the chassis so as to move in the first direction.

More specifically, the traverse holder preferably further includes a supporting pin on the base portion, and the elevating portion preferably elevates and lowers the supporting portion of the traverse holder.

In a specific preferred embodiment, the elevating portion preferably includes an elevating slide rack, which is movable perpendicularly to the first direction and which includes a cam groove to interlock with the supporting pin. By moving the elevating slide rack, the supporting pin preferably relatively slides along the cam groove and the traverse holder preferably moves in the third direction.

More particularly, the traverse holder preferably has a supporting surface, the elevating slide rack preferably has a supporting edge, and while the positioning pin is being inserted into the positioning hole as the traverse holder is elevated, the supporting edge of the elevating slide rack preferably contacts with the supporting surface of the traverse holder, thereby getting the traverse holder supported by the elevating portion.

Even more particularly, the traverse holder preferably includes a regulating pin in the vicinity of one of the first pair of damping members, and the chassis preferably includes a guide portion for regulating a direction in which the regulating pin moves.

In that case, at least while the positioning pin is being inserted into the positioning hole, the guide portion preferably regulates the movement of the regulating pin in the first direction.

In yet another preferred embodiment, the chassis preferably includes walls to prevent the regulating pin from going in the third direction beyond the upper limit of the guide portion.

In yet another preferred embodiment, the optical disc drive may further include a pressing portion for pressing the cartridge against the tray. After the positioning pin has been inserted into the positioning hole of the cartridge as a result of the movement of the traverse holder, the pressing portion preferably applies an elastic force to the cartridge.

In yet another preferred embodiment, the cartridge has a status sensing hole to provide some information about the disc in the cartridge, and the traverse holder includes a status sensing switch that is provided at a position corresponding to the status sensing hole of the cartridge.

According to the preferred embodiments of the present invention, since the positioning pin is provided for the traverse holder, it is possible to reduce the size of the traverse base. This further reduces the load of the motor driving the traverse base and prevents the noise from generating. Also, since the traverse holder and the traverse base are connected with each other, it is possible to reduce the number of the parts that are required between the traverse holder and the traverse base and to omit the positional alignment of the positioning pin with respect to the spindle motor. As a result, the positional alignment step during the manufacture of the optical disc apparatus can be eliminated in addition to the reduction in number of the parts, thereby reducing the production cost.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Figure 1:
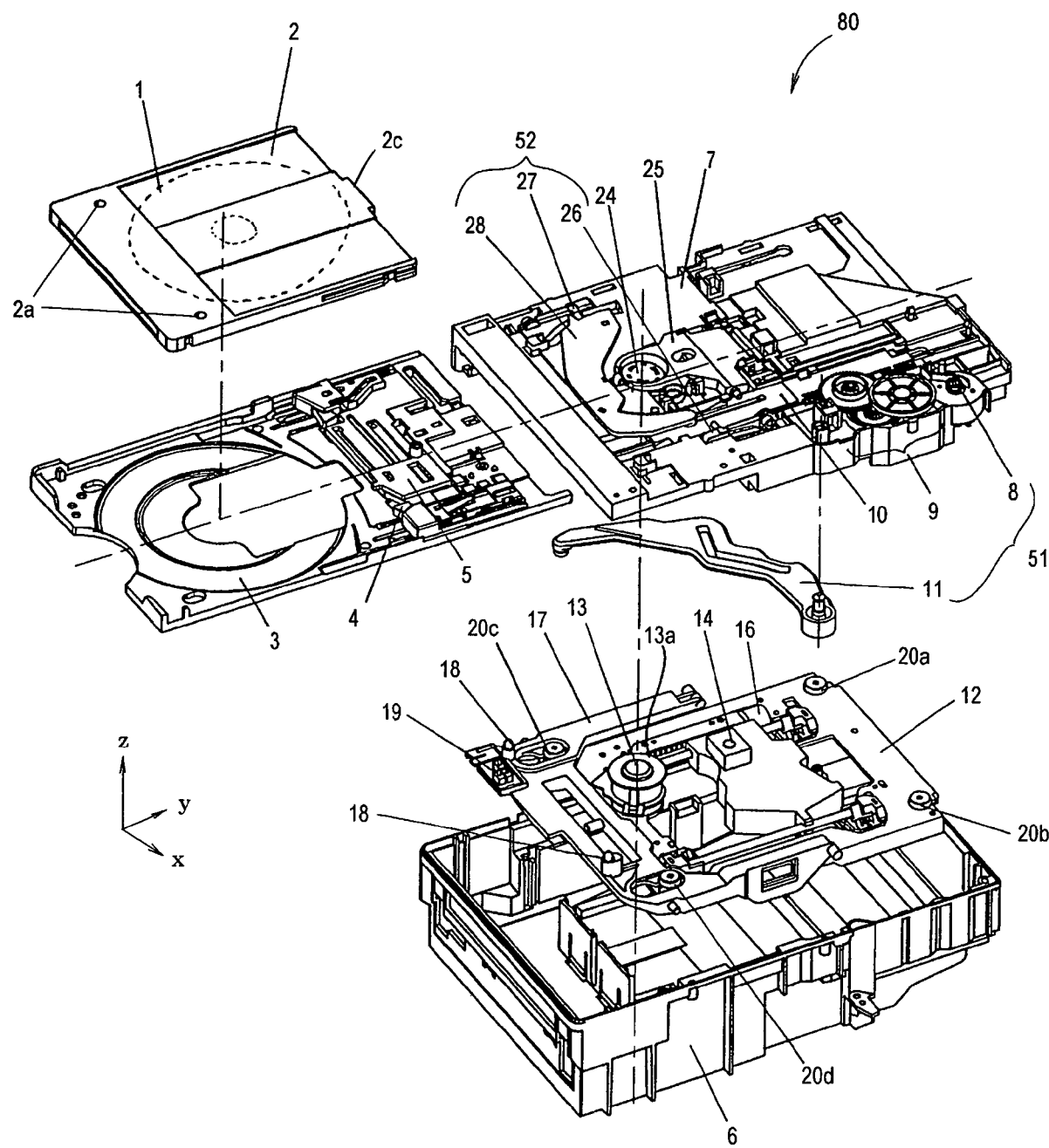
FIG. 1 is an exploded perspective view of an optical disc drive according to a preferred embodiment of the present invention.

FIG. 1 is an exploded perspective view of an optical disc drive 80 according to a preferred embodiment of the present invention. The optical disc drive 80 accommodates a cartridge 2 in which a disc 1 is stored as an information storage medium. Thus, by loading this optical disc drive 80 with the cartridge 2, the optical disc drive 80 can read and write information from/on the disc 1. First, the structure of this optical disc drive 80 will be outlined with reference to FIG. 1.

The optical disc drive 80 preferably includes a tray 3, a bottom chassis 6, a top chassis 7, and a traverse base 12. A chassis is made up of the bottom and top chassis 6 and 7 and a body is comprised of the bottom chassis 6, top chassis 7 and traverse base 12.

The tray 3 is used to mount the cartridge 2 thereon and is supported by the top chassis 7 so as to move in the y direction shown in FIG. 1. By moving the tray 3 in the y direction, the cartridge 2 can be loaded into, or unloaded from, the body consisting of the bottom chassis 6, top chassis 7, and traverse base 12. The tray 3 includes a shutter opener 5 for opening and closing the shutter 2c of the cartridge 2 and a pressurizing portion 4 for pressing the cartridge 2 against the tray 3 and fixing it at a predetermined position on the tray 3. In the drawings to be referred to herein, the y direction is the direction in which the tray is inserted into, or ejected from, the body to load or unload the cartridge 2 into/from the body. Using this direction as a reference, the direction perpendicular to the tray 3 will be referred to herein as a "z direction" and a direction parallel to the tray and perpendicular to the y direction will be referred to herein as an "x direction".

The top chassis 7 includes a drive section 51 for driving the tray 3 in the y direction, a clamper holder 25 that holds a clamper 24, and a pressing portion 52 for pressing the cartridge 2 against the tray 3. The drive section 51 includes a loading motor 8, a loading gear system 9, a tray driving rack 10 and a tray arm 11. The pressing portion 52 includes side arms 26 and 27 and a side arm elevating lever 28.

The traverse base 12 includes a spindle motor 13 for mounting and rotating the disc 1 thereon and an optical head 14 for reading and writing information from/on the disc 1. The traverse base 12 is coupled to the traverse holder 17 by way of a first pair of damping members 20c and 20d and is also supported to the bottom chassis 6 by way of a second pair of damping members 20a and 20b. The traverse holder 17 includes a positioning pin 18 to fit with the positioning hole 2a of the cartridge 2 and further includes a status sensing switch 19 for sensing the status of the cartridge 2. As will be described in detail later, the traverse base 12 is secured to the bottom chassis 6 so as to rotate around an axis that is defined parallel to the x-axis to extend through the second pair of damping members 20a and 20b.

Hereinafter, the structures of the respective members of this optical disc drive will be described in detail one by one.

Tray

Figure 2:
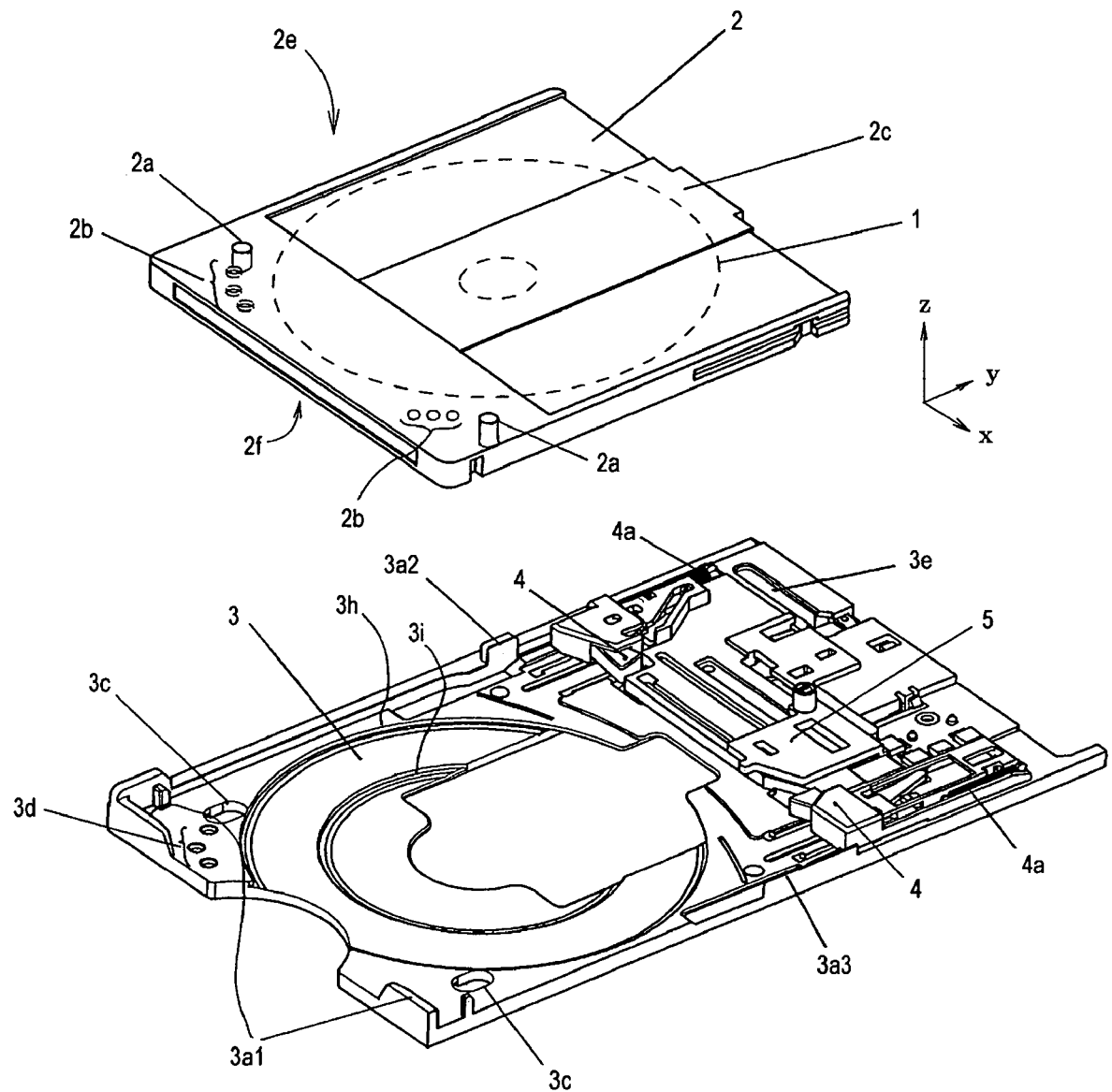
FIG. 2 is a perspective view illustrating a cartridge and the tray of the optical disc drive shown in FIG. 1.

FIG. 2 is a perspective view illustrating the cartridge 2 and tray 3. The cartridge 2 stores a disc 1 therein and has an opening to allow the optical head 14 and motor 13 (see FIG. 1) to access the disc 1. In FIG. 2, that opening is covered with a shutter 2c. The cartridge 2 has positioning holes 2a and status sensing holes 2b. This cartridge 2 is designed so as to house a double-sided disc. Thus, the positioning holes 2a and status sensing holes 2b are provided on both sides 2e and 2f of the cartridge 2. The positioning holes 2a define the position of the cartridge 2 with respect to the optical head 14 and motor 13 (see FIG. 1) on an x-y plane, which is parallel to the surface of the disc 1, and in a z direction, which is perpendicular to the disc surface. By appropriately positioning the cartridge 2, it is possible to prevent the disc 1 on the motor 13, optical head 14 or motor 13 from contacting with the cartridge 2 during a read or write operation. The status sensing holes 2 are used to provide some information about the disc 1 in the cartridge 2. For example, by sensing whether the status sensing holes 2 are opened or closed, the given disc 1 can be recognized as a double-sided or a single-sided.

The tray 3 has a front wall 3a1, a left wall 3a2 and a right wall 3a3, which together define a space that is slightly bigger than the outer dimensions of the cartridge 2. These walls function as a sort of guide for allowing the operator to put the cartridge 2 on the tray 3 properly. The pressurizing portion 4 is provided behind the tray 3 so as to apply an elastic force from springs 4a toward the front wall 3a1.

When the operator puts the cartridge 2 on the tray 3, he or she places the cartridge 2 within the space defined by the pressurizing portion 4, front wall 3a1, left wall 3a2 and right wall 3a3 while compressing the springs 4a by pressing the cartridge 2 against the pressurizing portion 4. Accordingly, when the cartridge 2 is mounted on the tray 3, an elastic force is applied from the pressurizing portion 4 to the cartridge 2 toward the front wall 3a1. As a result, the cartridge 2 can be firmly held within the tray 3 so as not to move inconstantly in the y direction. The shutter opener 5 is provided in the vicinity of the pressurizing portion 4 of the tray 3. The shutter opener 5 can slide in the x direction and engages with, and opens, the shutter 2c of the cartridge 2 on the tray 3 while the tray 3 is being inserted into the body.

Optionally, a recess 3h to mount an uncovered bare disc (i.e., not stored in the cartridge 2) may be provided in the space defined by the pressurizing portion 4, front wall 3a1, left wall 3a2 and right wall 3a3 of the tray 3. Furthermore, to mount a disc of a smaller size there directly, another recess 3i may be provided on the bottom of the recess 3h.

The tray 3 is further provided with holes 3c and 3d to receive the positioning pin and status sensing switch 19 of the traverse holder 17 (see FIG. 1).

Top Chassis

Figure 3:
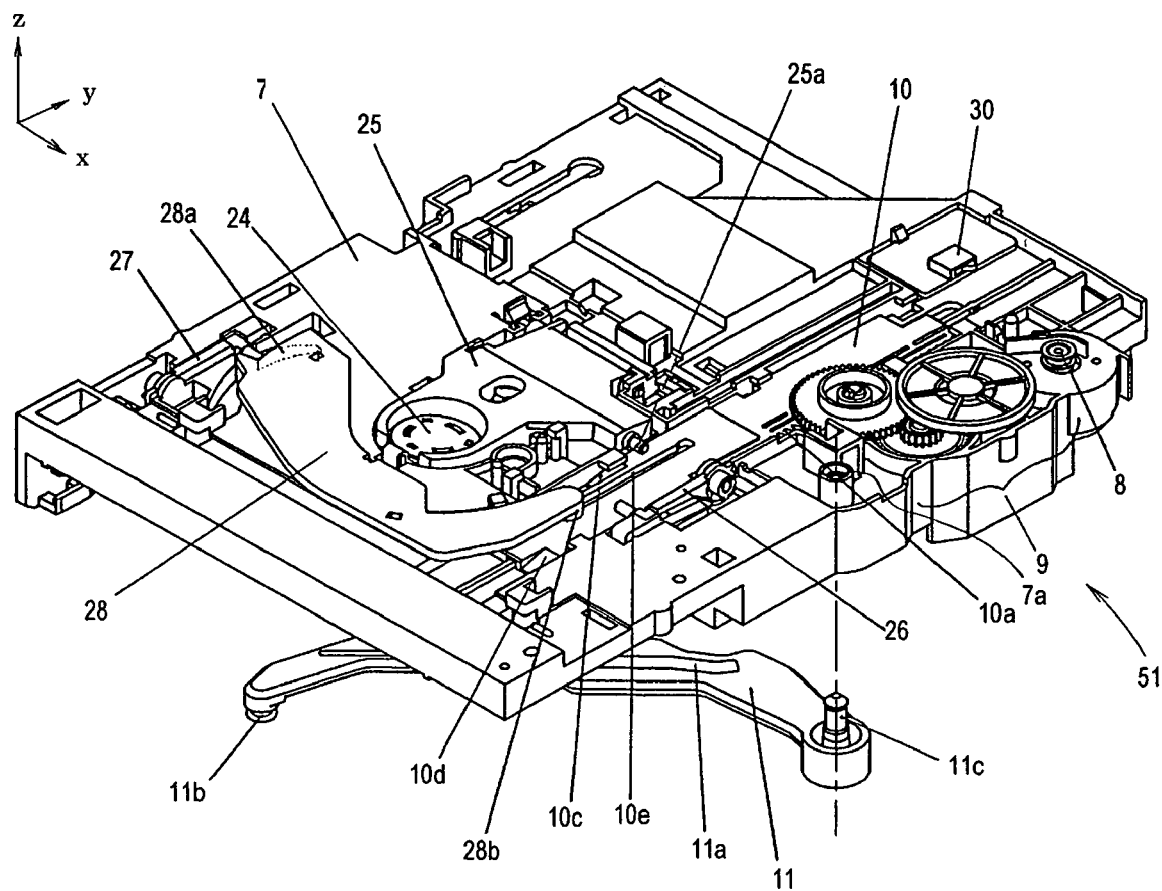
FIG. 3 is a perspective view illustrating the top chassis of the optical disc drive shown in FIG. 1.

FIG. 3 is an exploded perspective view of the top chassis 7. The top chassis 7 is located over the bottom chassis 6 and supports the tray 3 such that the tray 3 can move in the y direction. As described above, the top chassis 7 includes the drive section 51 consisting of the loading motor 8, loading gear system 9, tray driving rack 10 and tray arm 11. The tray driving rack 10 is supported on the upper surface of the top chassis 7 so as to be movable in the y direction. The rack portion 10a of the tray driving rack 10 engages with the loading gear system 9. The tray arm 11 includes a shaft 11c and a pin 11b, which are provided at both ends of the arm 11 so as to extend in mutually opposite directions, and has a cam groove 11a around the center thereof. When the shaft 11c is inserted into the bearing 7a of the top chassis 7, the tray arm 11 is ready to rotate around the bearing 7a. A pin (not shown) protruding downward from the tray driving rack 10 interlocks with the cam groove 11a of the tray arm 11. Also, the pin 11b interlocks with the cam groove 3e (see FIG. 2) of the tray 3.

Suppose the operator has put either the cartridge 2 or the disc 1 itself on the tray 3 that has already been ejected from the body and then presses an eject switch (not shown) provided on the front side of the optical disc drive, for example. Or if the operator directly pushes the tray 3 in the loading direction (i.e., in the y direction) to turn ON the position sensing switch (not shown) of the tray 3, then current flows from the driver circuit to the loading motor 8, thereby starting the operation of inserting the tray 3. If the loading motor 8 rotates in such a direction as to load the tray 3, then the rotational force is transmitted to the loading gear system 9, thereby shifting the tray driving rack 10 in the y direction (i.e., in the loading direction). In that situation, the pin of the tray driving rack 10 turns the tray arm 11 such that the pin 11b at the end of the tray arm 11 moves the tray 3 in the y direction.

At the center of the top chassis 7, a clamper 24 for clamping the disc 1 on the turntable 13a of the spindle motor 13 is secured in a rotatable state to a clamper holder 25. The clamper holder 25, in turn, is supported to the top chassis 7 in a rotatable state, too. And an elastic force is applied from a spring (not shown) to the clamper 24 toward the disc 1.

Also, a supporting pin 25a protruding in the x direction contacts with the guide portion of the tray driving rack 10. The guide portion has a tapered portion 10c. While the tray driving rack 10 is sliding to insert the tray 3, the clamper 24 is kept uplifted. But when the tray 3 is inserted fully, the supporting pin 25a lowers not only the tapered portion 10c but also the clamper 24 as well, thereby getting the optical disc drive ready to clamp the disc. At this point in time, however, the disc 1 has not been mounted on the turntable of the motor 13 yet.

At a deep position of the top chassis 7, an insertion sensing switch 30 for sensing the position of the tray driving rack 10 is fixed on a substrate. When the tray 3 is inserted fully in the body to get ready for the clamping operation, the tray driving rack 10 turns the insertion sensing switch 30 ON. As a result, the rotation of the loading motor 8 is suspended for a while to complete the tray inserting operation.

Traverse Base, Traverse Holder and Bottom Chassis

Figure 4:
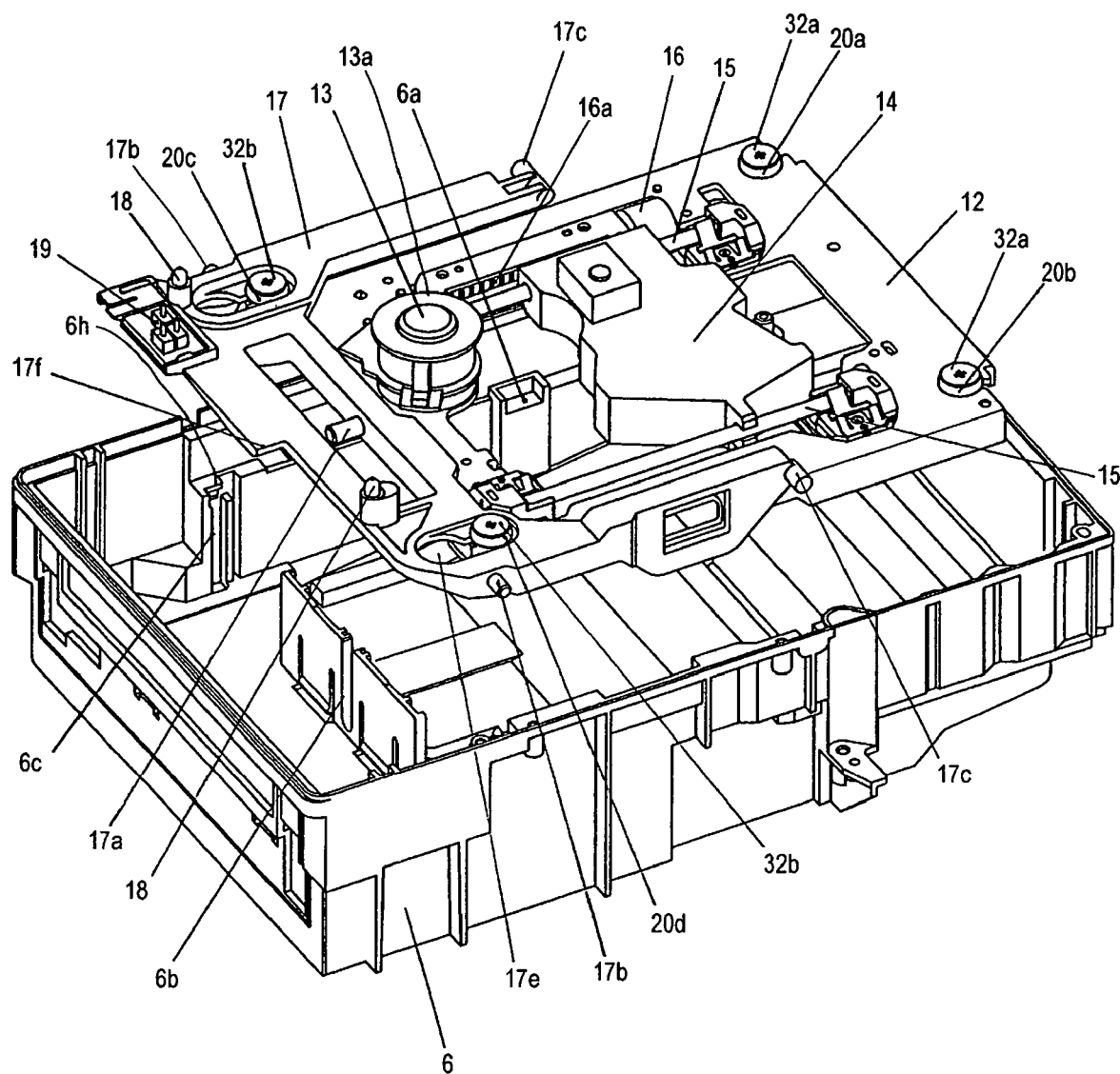
FIG. 4 is a perspective view illustrating the traverse holder, traverse base and bottom chassis of the optical disc drive shown in FIG. 1.

FIG. 4 is a perspective view illustrating the traverse base 12, traverse holder 17 and bottom chassis 6. As described above, the spindle motor 13 is supported on the traverse base 12. Also, the optical head 14 is secured to the traverse base 12 so as to shift along a pair of guide shafts 15 in the radial direction of the disc (i.e., in the y direction). These guide shafts 15 are secured to the traverse base 12 substantially parallel to each other with the spindle motor 13 interposed between them such that the beam spot formed by the optical head 14 shifts along the centerline of the disc 1.

A lead screw 16a is fixed adjacent and parallel to one of the two guide shafts 15 and engages with a nut piece (not shown) fixed on the optical head 14. A traverse motor 16 is directly coupled to the lead screw 16a. When the traverse motor 16 rotates, driving force to move the optical head 14 in the radial direction of the disc 1 is produced by way of the nut piece. Thus, the optical head 14 can move to the target radial location on the disc 1 quickly.

Figure 5:
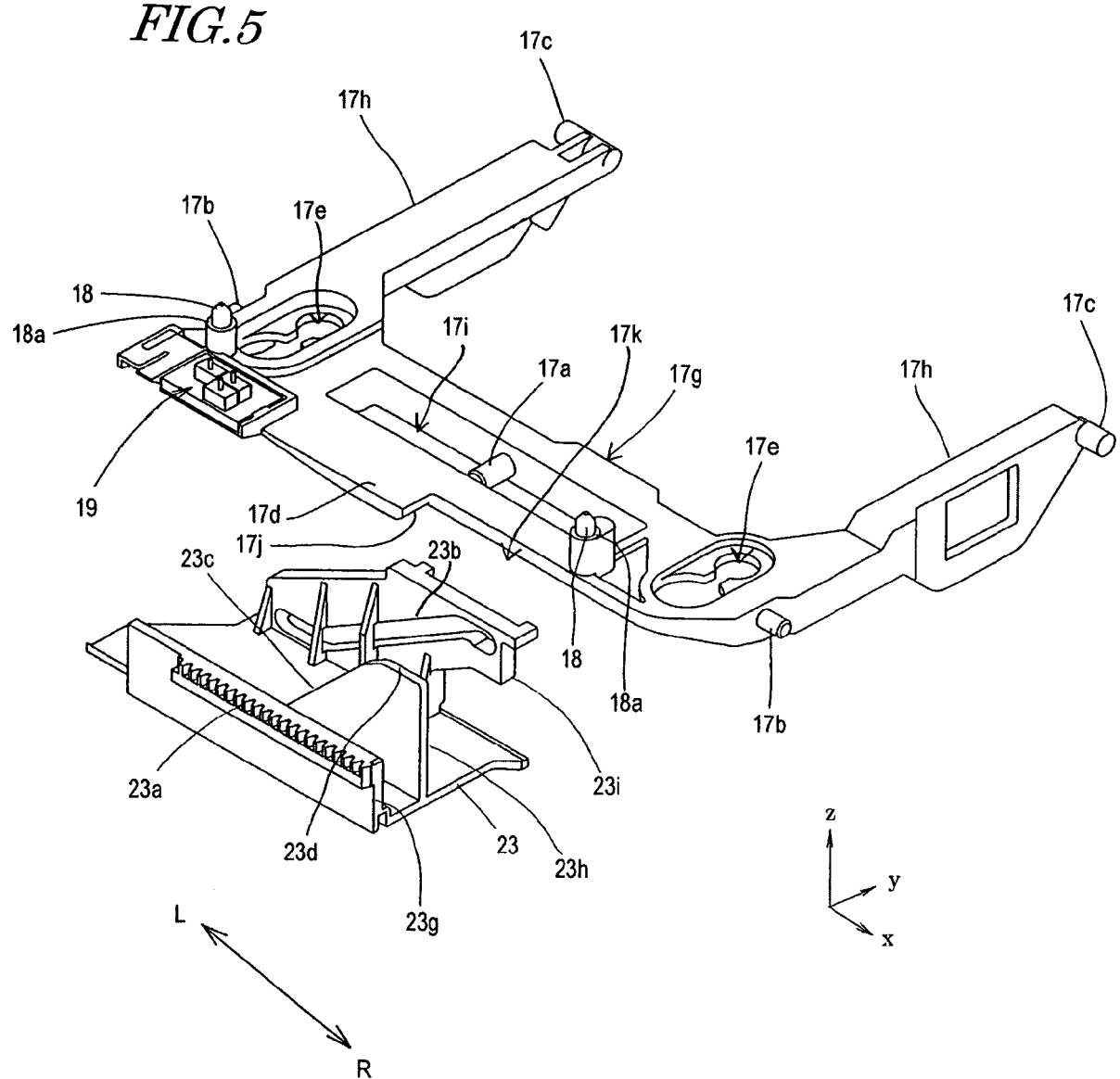
FIG. 5 is a perspective view illustrating the traverse holder and elevating slide rack of the optical disc drive shown in FIG. 1.

FIG. 5 is a perspective view illustrating the traverse holder 17. As shown in FIG. 5, the traverse holder 17 includes a base portion 17g extending in the x direction and a pair of arm portions 17h provided on both ends of the base portion 17g so as to extend in the y direction. An arm portion pin 17c is provided at the end of each arm portion 17h so as to extend in the x direction. A groove 17i is provided along the length of the base portion 17g. A supporting pin 17a is provided within the groove 17i so as to extend in the y direction. Furthermore, a pair of regulating pins 17b extending in the x direction is provided at both ends of the base portion 17g in the x direction.

A pair of positioning pins 18 is provided on the base portion 17g so as to be spaced apart from each other by the same gap as that provided between the positioning holes 2a of the cartridge 2 (see FIG. 1). Each of the positioning pins 18 has a pedestal 18a, which contacts with the back surface of the cartridge 2 surrounding its associated positioning hole 2a, thereby defining the position of the cartridge 2 perpendicularly to the disc 1.

Three status sensing switches 19 on a substrate are attached to around one end of the base portion 17g and at a position corresponding to the three status sensing holes 2b of the cartridge 2. Also, as will be described in detail later, a supporting surface 17d with a rounded edge corner 17j is provided.

Figure 6A:
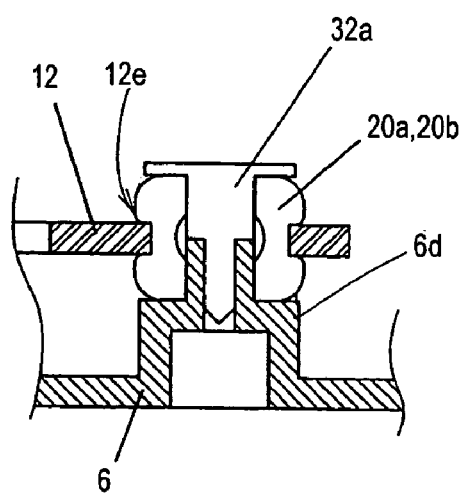
FIG. 6A is a cross-sectional view illustrating the structure of one of the damping members of the second pair and its surrounding portions.
Figure 6B:
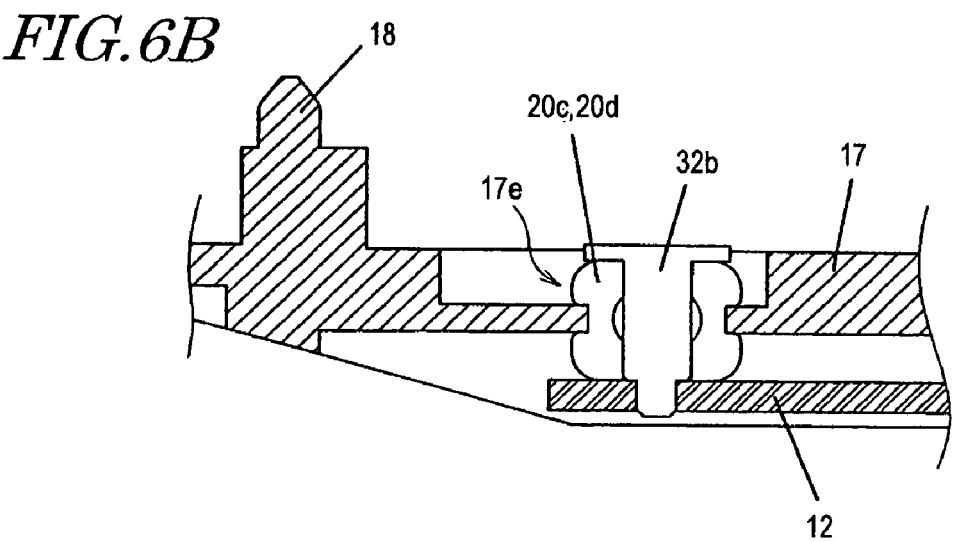
FIG. 6B is a cross-sectional view illustrating the structure of one of the damping members of the first pair and its surrounding portions.

The traverse base 12 is coupled to the traverse holder 17 with the first pair of damping members 20c and 20d and is preferably also coupled to the bottom chassis 6 with the second pair of damping members 20a and 20b. FIG. 6A illustrates a cross-sectional structure of each damping member 20a or 20b of the second pair and its surrounding portions, while FIG. 6B illustrates a cross-sectional structure of each damping member 20c or 20d of the first pair and its surrounding portions. As shown in FIG. 6A, the traverse base 12 has notched holes 12e to receive the second pair of damping members 20a and 20b and the second pair of damping members 20a and 20b are actually inserted into those holes 12e. The bottom chassis 6 includes a pair of convex portions 6d, each of which has a boss to be inserted into its associated damping member 20a or 20b of the second pair. As shown in FIG. 6A, the second pair of damping members 20a and 20b is inserted into the respective bosses of the convex portions 6d and fixed with screws 32a.

Figure 6C:
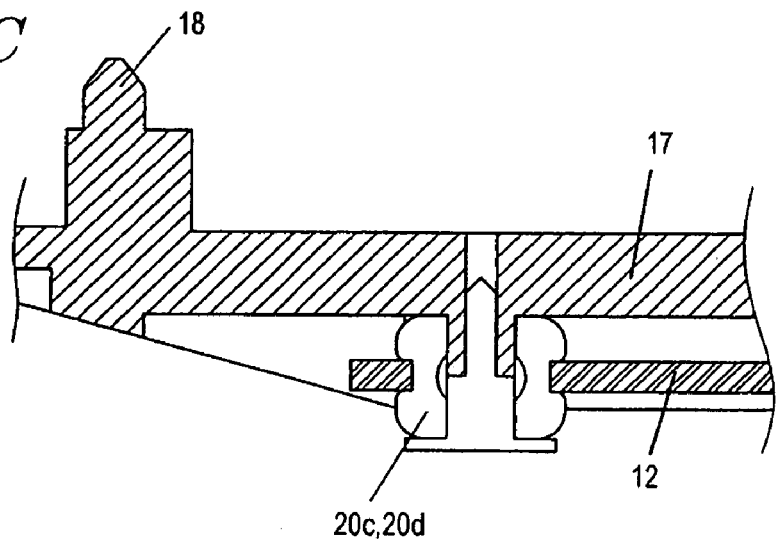
FIG. 6C is a cross-sectional view illustrating an alternative structure for one of the damping members of the first pair and its surrounding portions.

On the other hand, as shown in FIG. 6B, the traverse holder 17 has holes 17e to receive the first pair of damping members 20c and 20d and the first pair of damping members 20c and 20d is actually inserted into these holes 17e. The screws 32b are fixed onto the traverse base 12 through the first pair of damping members 20c and 20d, thereby coupling the traverse holder 17 and traverse base 12 together. Alternatively, holes may be opened through the traverse base 12 to receive the first pair of damping members 20c and 20d and the screws 23b may be fixed onto the traverse holder 17 through the first pair of damping members 20c and 20d as shown in FIG. 6C.

Each of the damping members 20c, 20d, 20a and 20b of the first and second pairs has damping property and damps the vibration of one of two associated members so that the vibration is not transmitted to the other. Also, the damping members 20a and 20b have such a degree of elasticity as to deform elastically. The first and second pairs of damping members 20c, 20d, 20a and 20b may be elastic members of rubber, for example.

Elevating Portion

Figure 7:
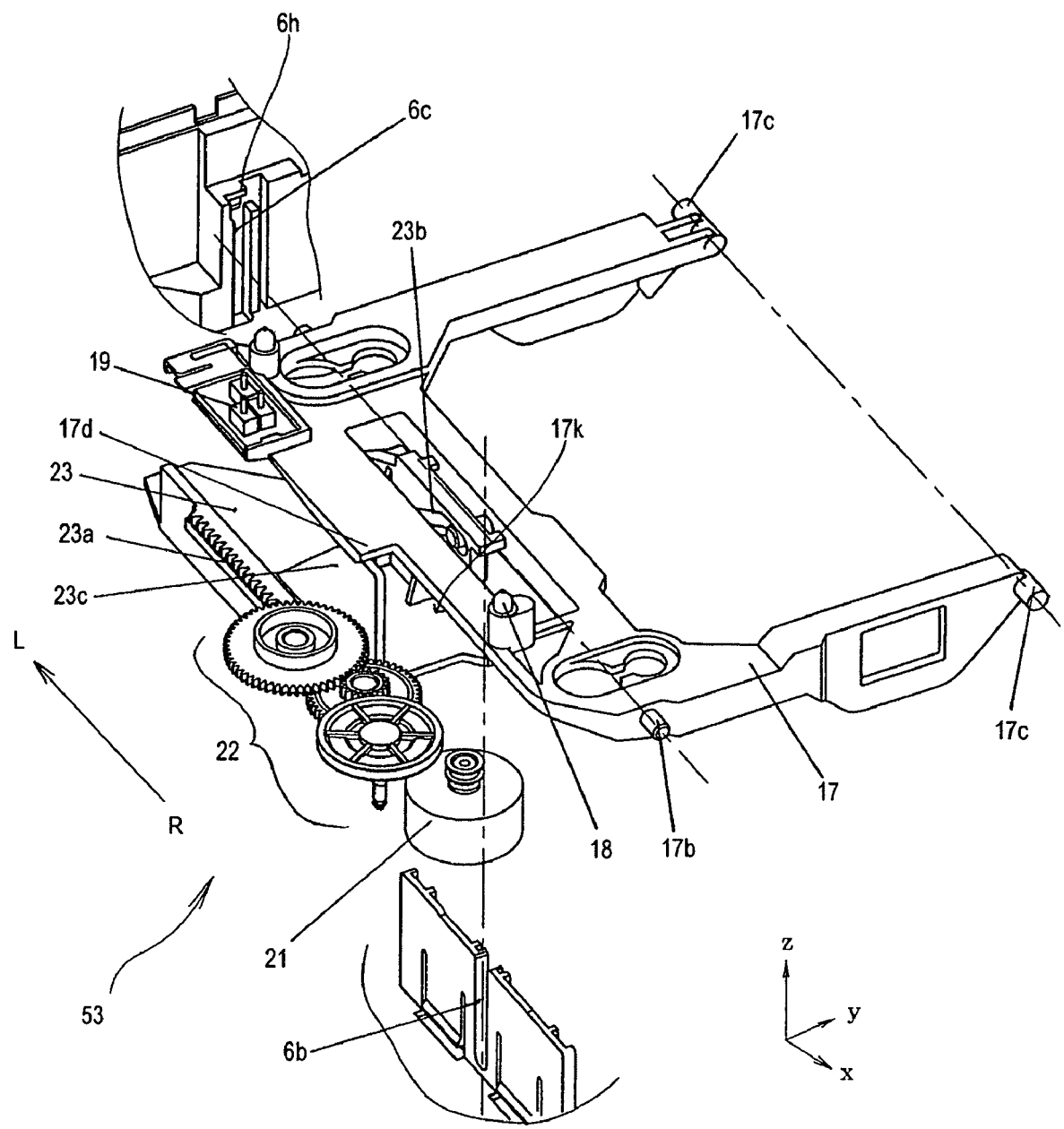
FIG. 7 is a perspective view illustrating the traverse holder and drive section of the optical disc drive shown in FIG. 1.

Hereinafter, the elevating portion for elevating and lowering the traverse base will be described with reference to FIGS. 4, 5 and 7. FIG. 7 is a perspective view illustrating the elevating portion 53. The elevating portion 53 includes an elevating motor 21, an elevating drive gear system 22, and an elevating slide rack 23. The elevating slide rack 23 is secured to the bottom chassis 6 so as to be movable in the x direction. As shown in FIG. 5, the elevating slide rack 23 has first, second and third flat portions 23g, 23h and 23i, which are perpendicular to the y direction and are parallel to each other. A rack portion 23a is provided on the first flat portion 23g and a cam groove 23b is provided through the third flat portion 23i. The second flat portion 23h has a sloped edge 23c and a horizontal supporting edge 23d.

As shown in FIG. 7, the rack portion 23a engages with the elevating drive gear system 22 and the rotational force of the elevating motor 21 is transmitted through the elevating drive gear system 22 to the rack portion 23a, thereby moving the elevating slide rack 23 in the x direction. The cam groove 23b is provided through the third flat portion 23i so as to have a sloped portion and interlocks with the supporting pin 17a of the traverse holder 17. The sloped edge 23c is one side of the second flat portion 23h and sloped in the same direction as the sloped portion of the cam groove. The horizontal supporting edge 23d is parallel to the x direction.

As shown in FIGS. 4 and 7, a first type of guide groove 6b is provided at the center of the bottom chassis 6 so as to interlock with the supporting pin 17a of the traverse holder 17 and regulate the position of the traverse holder 17 in the x direction. Also, on the right and left walls of the bottom chassis 6, a second type of guide grooves 6a are provided so as to fit with the regulating pins 17b and regulate the position of the traverse holder 17 in the y direction.

Hereinafter, it will be described how this optical disc drive operates.

Disc Mounting and Cartridge Positioning Operations

Figure 8A:
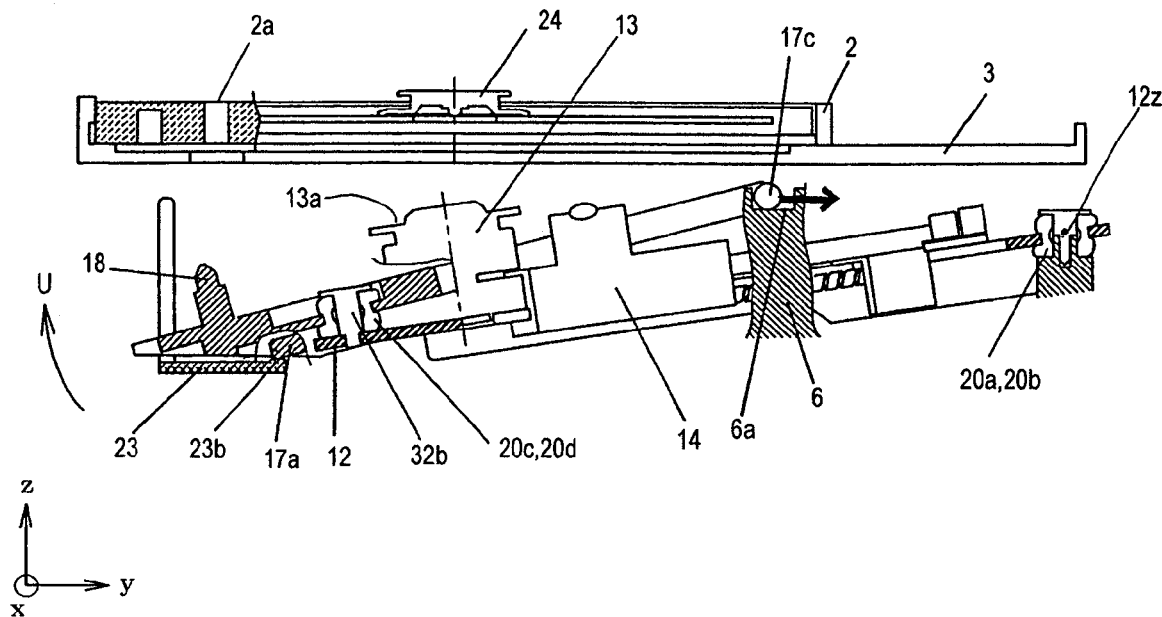
FIG. 8A is a partial cross-sectional view illustrating a state of the optical disc drive when the traverse base is lowered.
Figure 8B:
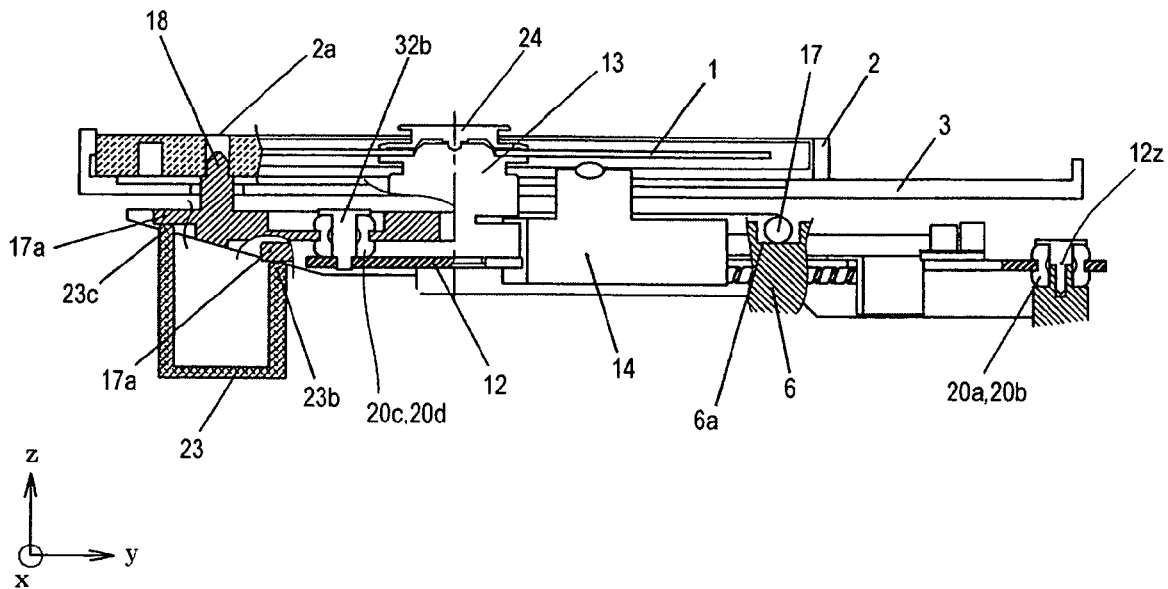
FIG. 8B is a partial cross-sectional view illustrating a state of the optical disc drive when the traverse base is elevated.

First, it will be described how the optical disc drive 80 having such a configuration mounts the disc 1 on the spindle motor 13 by rotating the traverse base 12. FIG. 8A is a side view illustrating a state of the optical disc drive 80 when the traverse base 12 is lowered, while FIG. 8B is a side view illustrating a state of the optical disc drive 80 when the traverse base 12 is raised. Some members are illustrated with cross sections.

As shown in FIG. 8A, when the cartridge 2 is mounted on the ejected tray 3 and the tray 3 is inserted into the body, the elevating slide rack 23 is located at a position indicated by the arrow R in FIG. 5 such that the supporting pin 17a is located at the bottom of the cam groove 23b. Accordingly, a portion of the traverse base 12 close to the front side is sloped downward and the spindle motor 13 is pushed down so as not to interfere with the disc 1 or cartridge 2 being inserted.

As the elevating motor 21 (see FIG. 7) rotates in the elevating direction, the elevating drive gear system 22 drives the elevating slide rack 23 in the direction indicated by the arrow L in FIG. 5. As a result, the supporting pin 17a of the traverse base 17 relatively moves in the cam groove 23b and goes upward along the sloped cam groove 23b. The movement of the supporting pin 17a in the z direction is regulated by the first type of guide groove 6b provided on the bottom chassis 6. Accordingly, the traverse holder 17 rotates in the direction indicated by the arrow U in FIG. 8A around the point of contact between the arm portion pin 17c and the receiving portion 6a of the bottom chassis 6.

In this case, as shown in FIG. 7, the regulating pins 17b of the traverse holder 17 engage with the second type of guide grooves 6c of the bottom chassis 6. Accordingly, during a certain period of the rotation operation of the traverse holder 17, the base portion 17g of the traverse holder 17 moves only in the z direction. The sloped edge 23c provided on the second flat portion 23h of the elevating slide rack 23 is located at the notch 17k of the base portion 17g of the traverse holder 17. Thus, the second flat portion 23h never contacts with the base portion 17g.

As shown in FIG. 8A, as the traverse holder 17 turns, the traverse base 12, which is coupled to the traverse holder 17 with the first pair of damping members 20c and 20d, rotates in the direction indicated by the arrow U around an axis 12z, which is parallel to the x direction that connects the second pair of damping members 20a and 20b together, until the traverse base 12 is substantially leveled as shown in FIG. 8B. The rotation of the traverse base 12 around the axis 12z is enabled by elastically deforming the second pair of damping members 20a and 20b. Also, while the traverse base 12 is lowered, the traverse base 12 is not parallel to the traverse holder 17. However, when the traverse base 12 is raised, the traverse base 12 becomes parallel to the traverse holder 17. That is to say, the relative angle of the traverse holder 17 to the traverse base 12 changes between these two positions. But the effects of such a relative angle variation are weakened by the elastic deformation of the first pair of damping members 20c and 20d.

As the traverse base 12 turns around the axis 12z, the traverse holder 17, which is coupled to the traverse base 12 with the first pair of damping members 20c and 20d, rotates with the arm portion pin 17c shifted in the y direction (i.e., with the point of contact between the arm portion pin 17c and the receiving portion 6a of the bottom chassis 6 shifted in the y direction). Accordingly, the arm portion pin 17c is preferably supported on the receiving portion 6a of the bottom chassis 6 so as to shift in the y direction. In such a structure, the location of the traverse holder 17 on an x-y plane is defined by the traverse base 12 that is coupled to the traverse holder 17 with the first pair of damping members 20c and 20d. In other words, the position of the positioning pin 18 provided for the traverse holder 17 and the position of the spindle motor 13 provided for the traverse base 12 are uniquely defined through the first pair of damping members 20c and 20d. Therefore, the positioning pin 18 can define the position of the cartridge 2 so that the disc mounted on the turntable of the spindle motor 13 is not contact with the cartridge 2. Also, since the traverse base 12 and traverse holder 17 are coupled together with the first pair of damping members 20c and 20d, the transmission of vibration is minimized between the traverse base 12 and traverse holder 17.

As shown in FIGS. 5 and 7, when the supporting pin 17a reaches the upper horizontal portion of the cam groove 23b as the elevating slide rack 23 shifts in the L direction, the sloped edge 23c of the second flat portion 23h of the elevating slide rack 23 contacts with the edge 17j of the supporting surface 27d. Then, the supporting edge 23d contacts with the supporting surface 17d of the traverse holder 17, thereby supporting the traverse holder 17 in place of the cam groove 23b. Accordingly, when the traverse base 12 is fully elevated, the supporting edge 23d of the elevating slide rack 23 makes a line contact with the supporting surface 17d of the traverse holder 17. As a result, the traverse base 12 can be kept uplifted with good stability.

Figure 9:
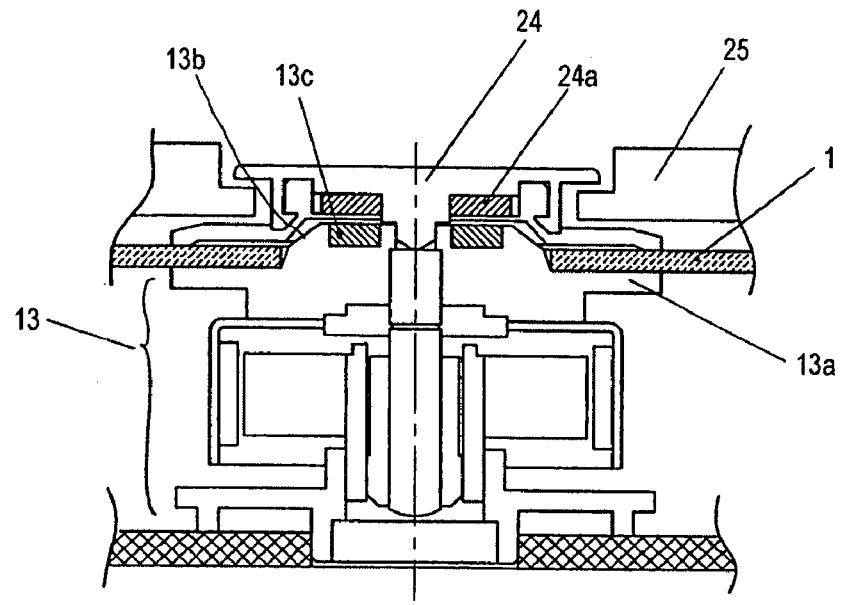
FIG. 9 is a cross-sectional view illustrating how the disc is clamped.

As the traverse base 12 is elevated, the disc 1 is going to be mounted on the turntable 13a of the spindle motor 13. As shown in FIG. 9, a tapered protrusion 13b with a circular cross section is provided at the center of the turntable 13a. By fitting this tapered protrusion 13b with the center hole of the disc 1, a disc centering operation is carried out to align the center of the spindle motor 13 with that of the disc 1. A magnet 13c is embedded in the tapered protrusion 13b and is attracted toward a magnetic body 24a embedded in the clamper 24 lowered, thereby clamping and fixing the disc 1 between the spindle motor 13 and the clamper 24. Alternatively, the magnet 13c may be provided for the clamper 24 and the magnetic body 24a may be provided for the spindle motor 13.

When the disc 1 is mounted on the turntable 13a of the spindle motor 13, the traverse holder 17 is elevated to insert the positioning pins 18 into the positioning holes 2a of the cartridge 2, thereby positioning the cartridge 2. The top of each positioning pin 18 is tapered. Accordingly, even if there were a small shift between the cartridge 2 and the positioning pins 18 due to the tolerances of the respective parts, the positioning pins 18 could also be inserted easily.

In this case, the positioning pins 18 are inserted into the positioning holes 2a of the cartridge 2 through the holes 3c of the tray 3. Those holes 3c of the tray 3 are large enough to provide a predetermined gap between the positioning pins 18 and the holes 3c themselves. Accordingly, if the optical disc drive received some significant impact when dropped by mistake, for example, then the inner surface of the holes 3c of the tray 3 would contact with the positioning pins 18, thereby preventing the tray 3 from being ejected out of the body unintentionally.

Figure 10:
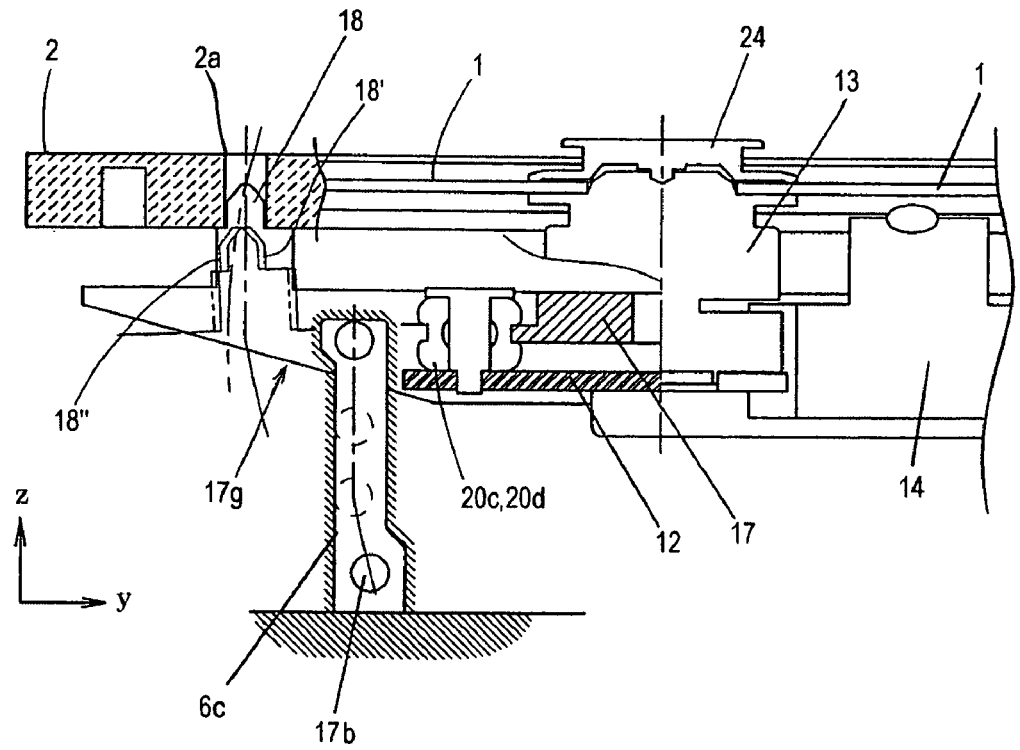
FIG. 10 is a cross-sectional view schematically showing where the positioning pin passes when the traverse holder moves.
Figure 11:
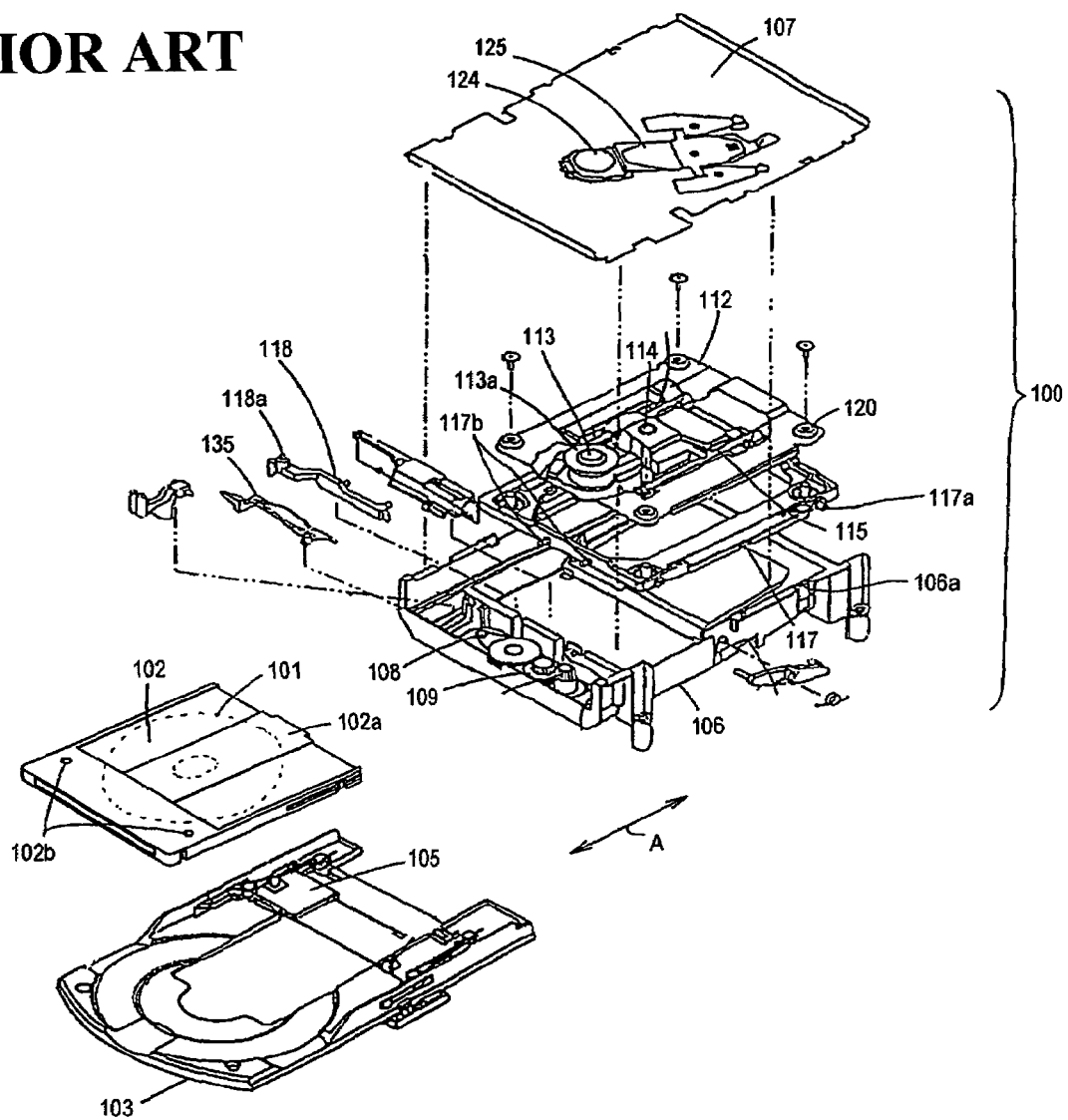
FIG. 11 is an exploded perspective view of a conventional optical disc drive.
Figure 12:
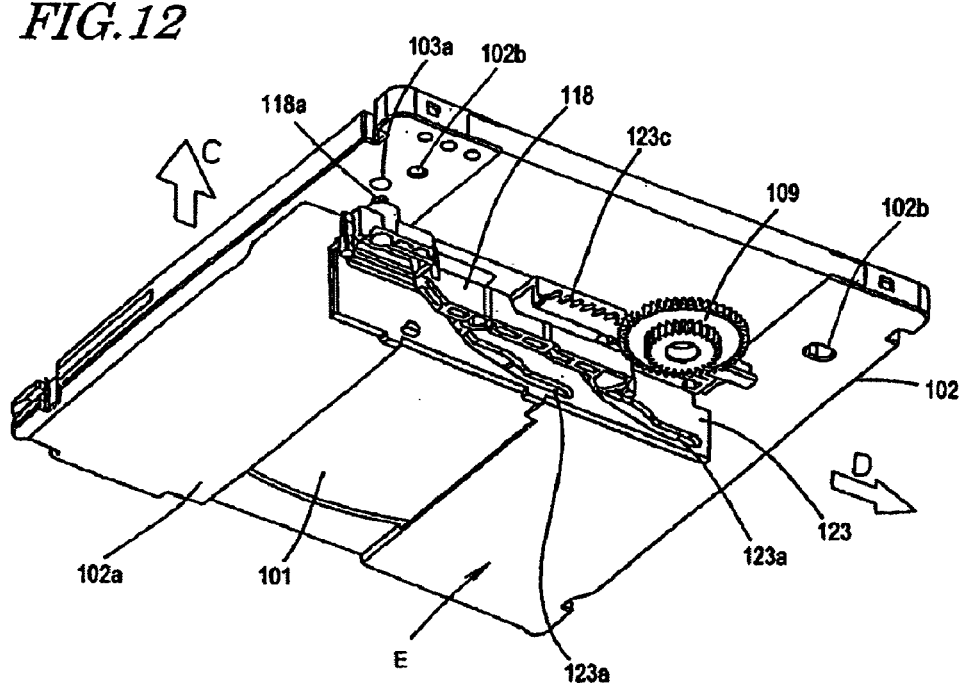
FIG. 12 is a perspective view showing how a positioning pin works in the conventional optical disc drive.
Figure 13:
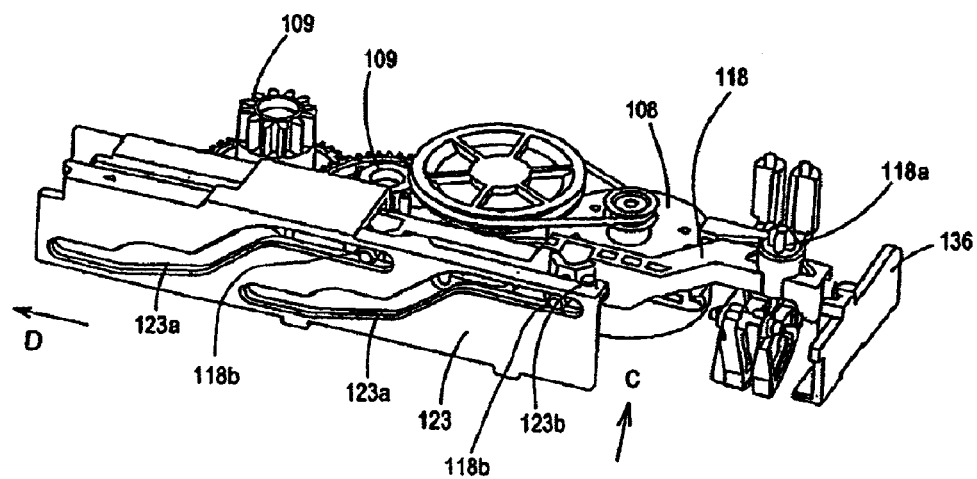
FIG. 13 is a perspective view illustrating the elevating portion of the conventional optical disc drive.

FIG. 10 illustrates where the positioning pin 18 passes as the traverse holder 17 is elevated. As shown in FIG. 10, the top portion of the second guide groove 6c of the bottom chassis 6 extends in the y direction such that the regulating pin 17b can shift slightly in the y direction. At the bottom of the second guide groove 6c, there is a space to allow the regulating pin 17b to move in the y and z directions. However, the intermediate portion of the guide groove 6c between the top and bottom portions thereof has a reduced width in the y direction such that the regulating pin 17b moves only in the z direction.

As described above, the traverse holder 17 is coupled to the traverse base 12 with the first pair of damping members 20c and 20d and the arm portion pin 17c of the traverse holder 17 is not fixed. Accordingly, as the traverse base 12 turns around the axis 12z, the regulating pin 17b is not regulated by the guide groove 6c while the regulating pin 17b is located at the bottom portion of the guide groove 6c. As a result, the base portion 17g of the traverse holder 17 and the regulating pin 17b of the base portion 17g move so as to draw a circle around the axis 12z.

When the regulating pin 17b reaches the intermediate portion of the guide groove 6c between the top and bottom portions thereof as the traverse base 12 further rotates, the movement of the regulating pin 17b is regulated by the guide groove 6c and allowed to move only in the z direction. Thus, the base portion 17g of the traverse holder 17 and the regulating pins 17b of the base portion 17g move only in the z direction. The first and second pairs of damping members 20c, 20d, 20a and 20b (or the first pair of damping members 20c and 20d among other things) reduce the difference in movement between the traverse base 12 still rotating around the axis 12z and the traverse holder 17 that is allowed to move only in the z direction. At this point in time, the positioning pins 18 provided on the base portion 17g are located almost right under the positioning holes 12a as indicated by the solid lines 18'. Accordingly, when the positioning pins 18 move in the y direction, the positioning pins 18 will be inserted into the positioning holes 18 straight. Consequently, compared to the situation where the positioning pins are inserted into the positioning holes 2a while drawing a circular trace as indicated by the two-dot chains 18" in FIG. 10, a much greater margin will be allowed in inserting the positioning pins and the positioning pins 18 can be inserted into the positioning holes 2a with much more certainty.

When the regulating pin 17b reaches the top of the guide groove 6c, the traverse base 12 is elevated fully. Then, the regulating pin 17b can move in the y direction within the top portion of the guide groove 6c. Accordingly, the first and second damping members 20c, 20d, 20a and 20b (or the first damping members 20c and 20d among other things) that have been deformed recover their original shapes, thereby maintaining a predetermined positional relationship between the positioning pins 18 and traverse base 12. By moving the positioning pins 18 in this manner, the positioning pins 18 should be inserted just as intended even if the positioning pins 18 were not provided separately from the traverse holder 17 as in the conventional optical disc drive. As a result, the number of members required and the manufacturing cost can be reduced both. In addition, compared to providing the positioning pins directly on the traverse base 12, a greater margin can be allowed in inserting the positioning pins due to the deformation of the first and second pairs of damping members. Consequently, the positioning pins can be inserted with more certainty.

As shown in FIGS. 4 and 7, a wall 6h is preferably provided at the top of each guide groove 6c of the bottom chassis 6 in order to prevent the regulating pin 17b of the traverse holder 17 from going further upward in the y direction. By providing this wall 6h, when the traverse holder 17 is elevated fully, the regulating pin 17b of the traverse holder 17 will not be raised excessively upward, and the traverse holder 17 can maintain a substantially flat and level position thanks to the elasticity of the first damping members 20c and 20d. Also, in the case where the optical disc apparatus 80 is subjected to an impact in an upper direction, the wall 6h prevents the regulating pin 17b from deviating towards the upper of the guide groove 6c.

Disc Status Sensing

Status sensing switches 19 on a substrate are provided in the vicinity of one of the positioning pins 18 on the traverse holder 17. When the traverse base 12 is elevated fully, the disc 1 is mounted on the turntable and the cartridge 2 is fixed at its predetermined position by the positioning pins 18. At the same time, the status sensing switches 19 are also inserted into the status sensing holes 2b of the cartridge 2. By seeing whether the status sensing holes 2b are open or closed, information about whether or not data can be written on the disc, information about whether the disc 1 has ever been removed from the cartridge 2, information about the type of the given storage medium (e.g., whether the medium is single-sided or double-sided) or any other type of information can be detected.

Cartridge Positioning

As shown in FIG. 3, a pair of side arms 26 and 27 for applying an elastic force to the cartridge 2 toward the tray 3 is provided in a rotatable state on right- and left-hand sides of the top chassis 7 in the x direction. The elastic force can be applied in a certain direction with springs. The side arm 26 contacts with a guide portion 10d of the tray driving rack 10 with a tapered portion in the vicinity of the point at which the elastic force is applied to the cartridge 2. Also, the side arm 27 contacts with a guide portion 28a of the side arm elevating lever 28 with a tapered portion in the vicinity of the point at which the elastic force is applied to the cartridge 2. The side arm elevating lever 28 is secured in a rotatable state to the top chassis 7 and the pin 28b protruding from the back surface of the lever 28 interlocks with the cam 10e of the tray driving rack 10.

The tray driving rack 10, which was stopped by the insertion sensing switch 30 when the tray 3 was inserted fully, further moves in the y direction when the loading motor 8 restarts to rotate after the traverse base 12 has been elevated fully and after the cartridge 2 has been positioned. As the tray driving rack 10 moves, the tapered portion 10d lowers the side arm 26 and the side arm elevating lever rotates, thereby making the tapered portion 28a lower the side arm 27. As a result, the side arms 26 and 27 apply an elastic force to the cartridge 2 toward the tray 3. These side arms 26 and 27 press the cartridge 2 against the tray 3 and also press the tray 3 against the top chassis 7 secured to the bottom chassis 6, thereby eliminating the inconstant movement among the cartridge 2, tray 3 and bottom chassis 6 and reducing the vibration and noise to be produced when the disc 1 rotates.

It is only after the positioning pins 18 have been inserted into the positioning holes 2a by elevating the traverse base 12 that the elastic force is applied from the side arms 26 and 27 to the cartridge 2. Accordingly, even if the cartridge 2 is somewhat shifted from its regular position while the positioning pins 18 are inserted into the positioning holes 2a, there is a reduced load in moving the cartridge 2 by inserting the positioning pins. As a result, the load on the elevating motor 21 can be reduced, the noise can be cut down, and the cartridge can be inserted with good stability.

As a result of the series of operations described above, the cartridge 2 is loaded into the optical disc drive 80, and the traverse base 12 is elevated fully to mount the disc 1 on the spindle motor 13. The clamping operation is also performed to get the disc 1 ready to spin and the optical disc drive 80 ready to perform a read or write operation on the disc 1.

In unloading the cartridge 2 from the optical disc drive 80, the operations described above are performed in reverse order. Specifically, first, the elastic force that has been applied from the side arms 26 and 27 to the cartridge 2 is removed. Next, the traverse base is lowered, thereby pulling the positioning pins 18 out of the positioning holes 2a and releasing the disc from the hold of the turntable and clamper. Thereafter, the tray 3 is ejected.

The optical disc drive 80 needs a much smaller number of members to position the cartridge 2. At least a predetermined gap needs to be provided between the cartridge 2 and the disc 1 such that the disc 1 rotating will not contact with the cartridge 2. The smaller the number of members intervening between the disc 1 mounted on the spindle motor 13 and the cartridge positioning pins, the smaller the sum of the tolerances of those members and the more accurately the cartridge can be held. In this preferred embodiment, the number of members intervening between the disc 1 and the cartridge 2 is four, namely, the spindle motor 13, traverse base 12, first pair of damping members 20c and 20d, and positioning pins 18 that form integral parts of the traverse holder 17. The conventional drive needs six members, and therefore, the number of required members can be reduced by more than 30% according to the present invention. As a result, the sum of errors can be reduced and there is no need to control the positions of the positioning pins 18 with respect to the spindle motor 13 in manufacturing the optical disc drive of the present invention. Consequently, not only the number of required members can be reduced but also the positioning control process step can be eliminated as well, thus cutting down the manufacturing cost significantly.

Also, in this preferred embodiment, the traverse holder 17 does not hold the traverse base 12 as a whole but supports it at just two points of contact formed by the first pair of damping members 20c and 20d. Thus, the traverse holder 17 can have a reduced size and the overall size of the drive can be reduced, too.

Furthermore, as shown in FIGS. 8A and 8B, as the tray 3 is being inserted, the elevating portion 51 lowers the traverse holder 17 and traverse base 12. In this case, however, the traverse holder 17 rotates around the arm portion pins 17c. That is to say, the traverse base 12 and traverse holder 17 rotate around mutually different axes. Specifically, the traverse holder 17 can rotate and be bent to a greater degree than the traverse base 12 within a range in which the first pair of damping members 20c and 20d are deformable. Accordingly, compared to a drive in which the positioning pins 18 form integral parts of the traverse base 12, the top of the traverse holder 17, including the positioning pins 18 and status sensing switches 19 thereon, can be lowered sufficiently by rotating the traverse base 12 to a smaller degree. That is to say, the relatively heavyweight traverse base 12 needs to be rotated to a smaller degree. Furthermore, the traverse base 12 made of a heavyweight plate metal, for example, can have a reduced size and a reduced weight, too. Thus, the load on the elevating motor can be lightened, and therefore, the traverse base 12 can be elevated much more smoothly.

While the traverse holder 17 and traverse base 12 are uplifted, the position of the traverse holder 17 is determined by the supporting portion 17d, which contacts with the traverse holder supporting edge 23c of the elevating slide rack 23, and the arm portion pins 17c, which contact with the bottom chassis 6 on the opposite end, as their supporting points. In this case, the elastic force applied from the side arms 26 and 27 to the cartridge 2 is also transmitted to the traverse holder 17 by way of the positioning pins 18. The fulcrum of this elastic force is located between the supporting portion 17d and the arm portion pins 17c of the traverse holder 17. Accordingly, the position of the traverse holder 17 can be stabilized.

The traverse base 12 is supported at the four points of the first and second pairs of damping members 20c, 20d, 20a and 20b. Among these four points, the two deeper ones are directly fixed to the bottom chassis 6 by way of the second pair of damping members 20a and 20b. The traverse base 12 can be firmly fixed onto the heavyweight bottom chassis 6. Thus, even if a disc, of which the center of mass is too eccentric to comply with the standard (as is often the case with CDs), were mounted, the vibration would not be transmitted to the surrounding portions easily and the chatter can be minimized.

In the preferred embodiment described above, the damping members are rubber dampers with elasticity. However, the damping members may also be made of any other material as long as the damping members exhibit damping property and elasticity. For example, dampers having a hollow structure, in which the air or some viscous substance is enclosed airtight, may be used. Optionally, another external damper may be added to damp the vibration being applied to the overall bottom chassis 6. Then, that external damper may be used to absorb the external vibration or impact coming from the environment in which the drive is placed, for example, while the internal dampers attached to the traverse base may be used to cancel the effects of the eccentric center of mass of the disc. In that case, these two types of dampers can be prepared with their best possible designs, thus realizing a drive with excellent damping property.

In the preferred embodiment described above, the traverse holder includes two positioning pins. However, if a standing wall to be provided as a guide for mounting the cartridge on the tray is also used to position the cartridge, just one positioning pin may be provided. Also, the tray is supported on the top chassis in the preferred embodiment described above. However, the optical disc drive may also be designed to support the tray on the bottom chassis.

This application is based on Japanese Patent Applications No. 2003-295109 filed on Aug. 19, 2003 and No. 2004-230364 filed on Aug. 6, 2004, the entire contents of which are hereby incorporated by reference.

Various preferred embodiments of the present invention described above are applicable for use in numerous types of optical disc drives that accommodate a cartridge including a disc in many fields of applications. Among other things, the present invention can be used particularly effectively in recorder/players, computers and navigation systems with an optical disc drive.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive comprising:
   a tray for mounting thereon a cartridge in which a disc is housed as an information storage medium and which has a positioning hole;
   a spindle motor for mounting and rotating the disc in the cartridge thereon;
   a chassis for supporting the tray such that the tray is movable in a first direction which is substantially parallel to the disc being mounted on the spindle motor;
   an optical head for reading or writing information from/on the disc;
   a traverse base, which is supported on the chassis so as to rotate around an axis that is defined in a second direction near one end of the chassis in the first direction and which mounts the spindle motor and the optical head thereon, the second direction being substantially parallel to the disc mounted on the spindle motor and perpendicular to the first direction;
   a traverse holder coupled to the traverse base;
   a positioning pin, which is provided for the traverse holder and which fits in with the positioning hole of the cartridge, thereby positioning the cartridge;
   an elevating portion for moving a portion of the traverse holder in a third direction that is defined perpendicularly to the disc in the cartridge; and
   a first pair of damping members for coupling the traverse holder and the traverse base together near the other end of the chassis in the first direction, the first pair of damping members having elasticity and damping property,
   wherein the traverse holder is rotatable around an axis which is substantially parallel to the second direction and is mutually different from the axis of the traverse base.

2. The optical disc drive of claim 1, further comprising a second pair of damping members for coupling the chassis and the traverse base together so as to allow the traverse base to rotate around the axis that is defined in the second direction.

3. The optical disc drive of claim 1, wherein the positioning pin forms an integral part of the traverse holder.

4. The optical disc drive of claim 3, wherein the traverse holder includes a base portion and a pair of arm portions extending from the base portion toward the one end of the traverse base, the end of each said arm portion being secured to the chassis so as to move in the first direction.

5. The optical disc drive of claim 4, wherein the traverse holder further includes a supporting pin on the base portion, and wherein the elevating portion elevates and lowers the supporting portion of the traverse holder.

6. The optical disc drive of claim 5, wherein the elevating portion includes an elevating slide rack, which is movable perpendicularly to the first direction and which includes a cam groove to interlock with the supporting pin, and wherein by moving the elevating slide rack, the supporting pin relatively slides along the cam groove and the traverse holder moves in the third direction.

7. The optical disc drive of claim 6, wherein the traverse holder has a supporting surface, the elevating slide rack has a supporting edge, and while the positioning pin is being inserted into the positioning hole as the traverse holder is elevated, the supporting edge of the elevating slide rack contacts with the supporting surface of the traverse holder, thereby getting the traverse holder supported by the elevating portion.

8. The optical disc drive of claim 7, wherein the traverse holder includes a regulating pin in the vicinity of one of the first pair of damping members, and wherein the chassis includes a guide portion for regulating a direction in which the regulating pins moves.

9. The optical disc drive of claim 8, wherein at least while the positioning pin is under the process of being inserted into the positioning hole, the guide portion controls the movement of the regulating pin in the first direction.

10. The optical disc drive of claim 9, wherein the chassis includes walls at the top of the guide portion so as to prevent the regulating pin from moving towards a side close to the tray.

11. The optical disc drive of claim 1, further comprising a pressing portion for pressing the cartridge against the tray,
    wherein after the positioning pin has been inserted into the positioning hole of the cartridge as a result of the movement of the traverse holder, the pressing portion applies an elastic force to the cartridge.

12. The optical disc drive of claim 1, wherein the cartridge has a status sensing hole to provide some information about the disc in the cartridge, and the traverse holder includes a status sensing switch that is provided at a position corresponding to the status sensing hole of the cartridge.

* * * * *